(12) United States Patent
Benson

(10) Patent No.: US 6,343,890 B1
(45) Date of Patent: Feb. 5, 2002

(54) FASTENER AND CONNECTION ASSEMBLY

(75) Inventor: Julie Maureen Benson, Lancaster, PA (US)

(73) Assignee: Graco Children's Products Inc., Elverson, PA (US)

( * ) Notice: Subject to any disclaimer, the term of this patent is extended or adjusted under 35 U.S.C. 154(b) by 0 days.

(21) Appl. No.: 09/421,239

(22) Filed: Oct. 20, 1999

(51) Int. Cl.[7] .................................................. F16B 7/10
(52) U.S. Cl. ....................... 403/329; 285/301; 285/302; 403/408.1; 403/109.8; 403/326
(58) Field of Search ............................... 403/408.1, 345, 403/326–329, 109.3, 109.8, 379.6, 378; 285/301, 302; 292/338, 339

(56) References Cited

U.S. PATENT DOCUMENTS

| | | | |
|---|---|---|---|
| 4,247,216 A | 1/1981 | Pansini | 403/109 |
| 4,284,287 A | 8/1981 | Esposito | 280/47.37 R |
| 4,666,179 A | 5/1987 | Adams | 280/655 |
| 4,679,261 A | 7/1987 | Stanley et al. | 5/183 |
| 5,257,800 A | 11/1993 | Yang | 280/654 |
| 5,308,103 A | 5/1994 | Chin-Shung | 280/655 |
| 5,353,900 A | 10/1994 | Stilley | 190/18 A |
| 5,375,938 A * | 12/1994 | Bartlow | |
| 5,431,428 A | 7/1995 | Marchwiak et al. | 280/655 |
| 5,499,702 A | 3/1996 | Wang | 190/115 |
| 5,548,864 A | 8/1996 | Vosbikian et al. | 15/257.7 |
| 5,590,974 A | 1/1997 | Yang | 403/327 |
| 5,779,386 A | 7/1998 | Eichhorn | 403/329 |
| 5,871,227 A | 2/1999 | Huang | 280/642 |
| 5,911,431 A | 6/1999 | Brown et al. | 280/642 |
| 6,079,894 A * | 6/2000 | Obitts | 403/109.3 |

\* cited by examiner

Primary Examiner—Lynne H. Browne
Assistant Examiner—Tomlyne A Malcolm
(74) Attorney, Agent, or Firm—Foley & Lardner

(57) ABSTRACT

A fastener has an integral closure. The fastener maintains the relative position of concentrically nested or telescopically related inner and outer tubes. The closure occludes the inner tube. The fastener can be used for assembling children's products such as play-yards, strollers, swings, and other types of furniture, transports, and accessories.

12 Claims, 3 Drawing Sheets

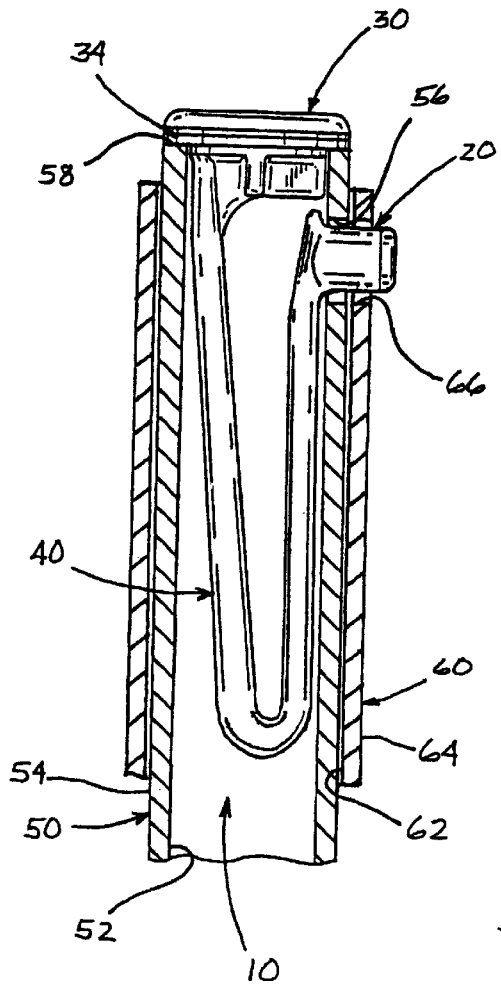
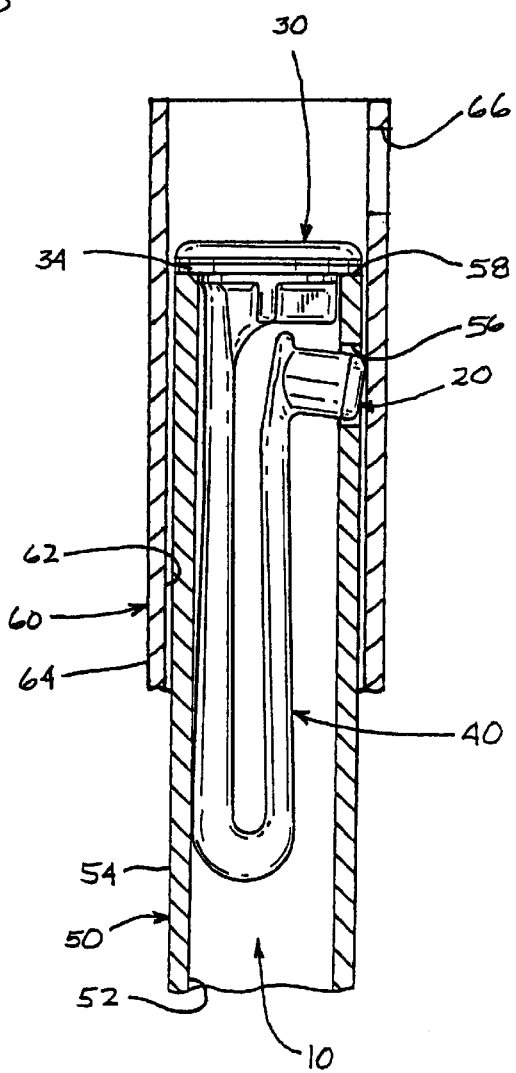
FIG. 5
FIG. 6

FASTENER AND CONNECTION ASSEMBLY

BACKGROUND

Many types of children's products are assembled using tubular components that must be fixed to one another or to a bracket. Frequently, these tubular components are manufactured from metal or plastic. By allowing a retailer or the consumer to assemble the children's product, the bulk of the product may be reduced, and hence the costs of packaging and shipping the product may also be reduced. However, it is necessary to provide a fastener that is easy for the retailer or consumer to use, and that provides a positive connection.

It has also been found desirable to enable consumers to repeatedly assemble and disassemble some children's products in order to facilitate frequent transportation of the product. Thus, the connections must be able to perform reliably through a great number of duty cycles.

One type of conventional fastener for a joint between two nested tubular components includes a projection that is biased to extend through aligned holes in each of the tubular components. Conventionally, the projection is biased by a resilient element located inside the inner one of the tubular components. Examples of such conventional fasteners in children's products are disclosed in U.S. Pat. No. 5,911,431 (Brown et al.), U.S. Pat. No. 5,871,227 (Huang), and U.S. Pat. No. 5,779,386 (Eichhorn). Examples of these conventional fasteners in other technologies include U.S. Pat. No. 5,590,974 (Yang), U.S. Pat. No. 5,548,864 (Vosbikian et al), U.S. Pat. No. 5,499,702 (Wang), U.S. Pat. No. 5,431,428 (Marchwiak et al.), U.S. Pat. No. 5,353,900 (Stilley), U.S. Pat. No. 5,308,103 (Chin-Shung), U.S. Pat. No. 5,257,800 (Yang), U.S. Pat. No. 4,679,261 (Stanley et al.), U.S. Pat. No. 4,666,179 (Adams), U.S. Pat. No. 4,284,287 (Esposito), and U.S. Pat. No. 4,247,216 (Pansini).

In operation, the projection maintains the relative positional relationship of the tubular components. At such time as it is desirable to disconnect or reorient the tubular components with respect to one another, the projection is depressed against the bias of the resilient element until the projection is clear of the outer tubular element. At this time, the outer tubular element may be displaced relative to the inner tubular element.

One disadvantage of these conventional fasteners is that the projection may be depressed too aggressively such that the projection also clears the inner tubular element. In this situation, the projection or resilient element may be displaced to such a degree that the projection is no longer positioned to extend through the inner tubular element, thus rendering the connection inoperable.

In the course of assembling a children's product that includes nested or telescopic elements, e.g., tubes, it is also desirable to provide a closure for occluding an exposed end of at least one of the elements. Conventional closures, e.g., plugs or end caps, prevent foreign substances from entering the element's exposed end, as well as improve the aesthetic qualities of the product. Traditionally, these conventional closures are installed once, i.e., they are not intended to be removed/replaced each time a product is disassembled/reassembled. Such conventional closures are independent and unrelated to conventional fasteners.

One disadvantage of these conventional closures is that they are often dislodged from the end of the tubular element. These conventional closures are traditionally held in the end by an interference fit, which, in the course of regular use, may become loose, thus enabling the conventional closure to simply fall out of the end of the tubular element.

SUMMARY OF THE INVENTION

The present invention is drawn to a fastener with an integral closure, and a connection assembly. The fastener can maintain the relative position of concentrically nested or telescopically related inner and outer tubes. The fastener has an integral closure that can occlude a tubular member. The fastener can be used for assembling children's products such as play-yards, strollers, swings, and other types of furniture, transports, and accessories.

The fastener can maintain the relative position of concentrically nested inner and outer tubes, where the inner tube has an inside surface and an outside surface separated by a first tubing wall thickness, the outer tube has an interior surface and an exterior surface separated by a second tubing wall thickness, and the inner and outer tubes have respective first and second holes penetrating the first and second wall thicknesses, respectively.

The fastener has a projection, a resilient body, and a closure. The projection can matingly engage the first and second holes. The resilient body is connected to the projection and can bias the projection through the first and second holes. The resilient body is elastically deformable between a first configuration, where the projection can extend through the first and second tubing wall thicknesses, and a second configuration, where the projection can extend through the first tubing wall thickness. The closure is integrally connected to the resilient body and can overlie the first wall thickness.

The connection assembly includes a combination of the fastener and the inner and outer tubes.

BRIEF DESCRIPTION OF THE DRAWINGS

The accompanying drawings show an illustrative embodiment of the invention.

FIG. 5 is a cross-section view showing a connection between two nested tubes wherein the fastener according to the present invention is in a first configuration.

FIG. 6 is a cross-section view similar to FIG. 5 showing the fastener according to the present invention is in a second configuration.

DETAILED DESCRIPTION

Figure 1:
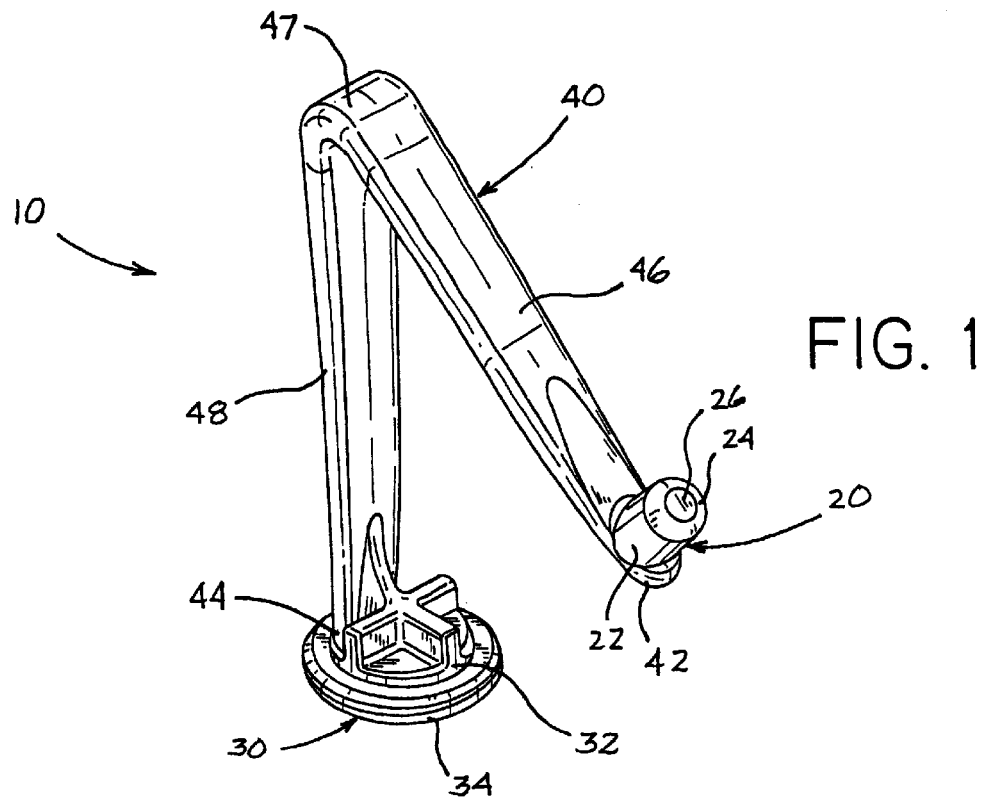
FIG. 1 is a perspective view of a fastener in accordance with the present invention, wherein the fastener is in a relaxed configuration.
Figure 2:
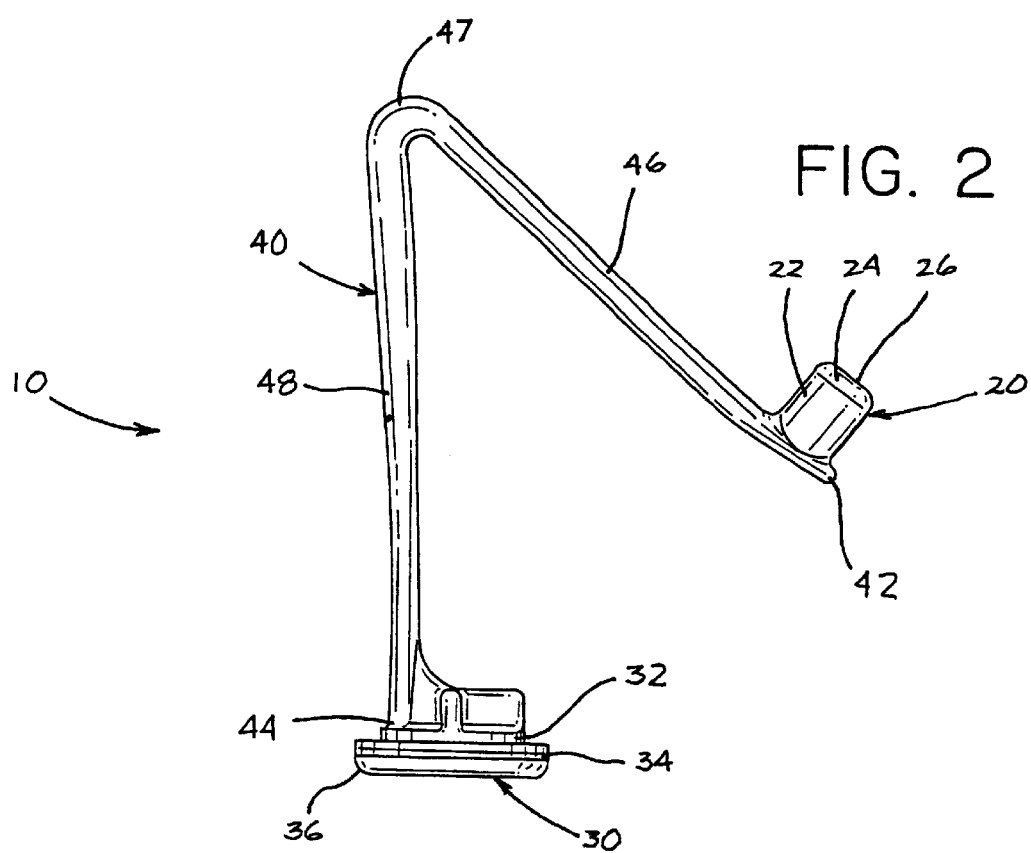
FIG. 2 is a front elevation view of the fastener shown in FIG. 1.
Figure 3:
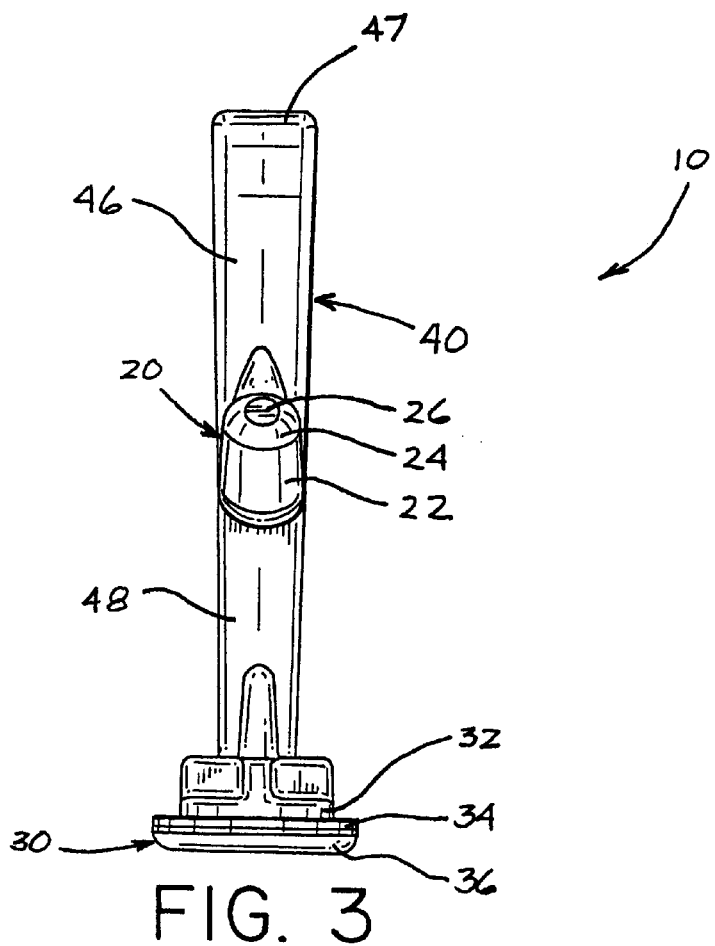
FIG. 3 is a side elevation view of the fastener shown in FIG. 1.
Figure 4:
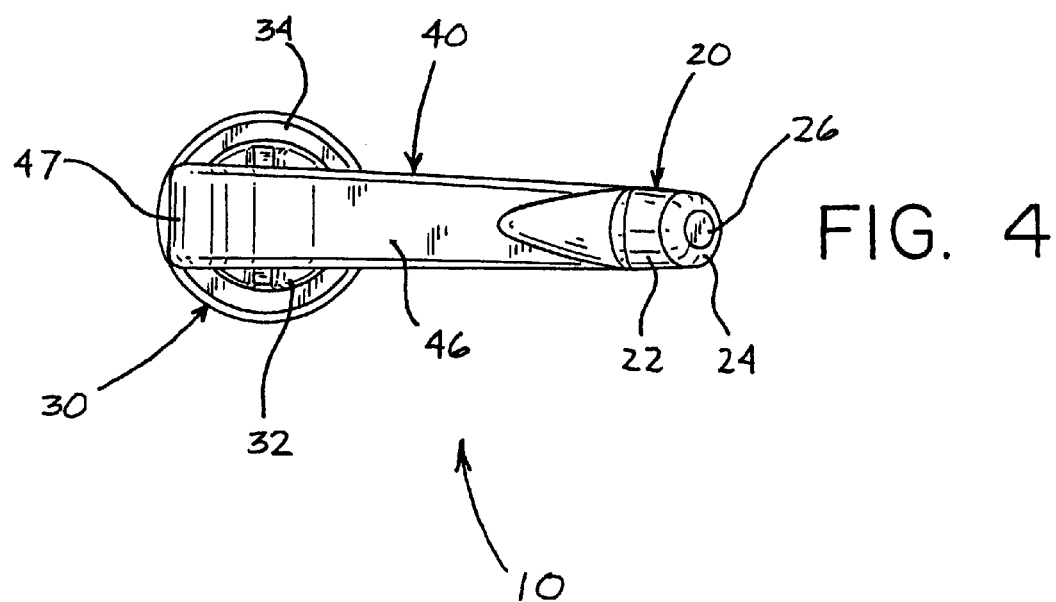
FIG. 4 is a plan view of the fastener shown in FIG. 1.

Referring now to the drawings, wherein identical numerals indicate like parts, and initially to FIGS. 1–4, a fastener 10 includes a projection 20 and a closure 30 that are fixed to a resilient body 40. The projection 20 is fixed to a first end 42 of the resilient body 40 and the closure 30 is fixed to a second end 44 of the resilient body 40.

The projection 20 is shown as a right-circular cylinder 22 having a rounded edge 24 and a flat tip 26. However, the projection 20 need not be limited to this orientation or shape. The projection 20 may be oriented to extend arcuately as well as linearly from the first end 42. The projection 20 may have any cross-sectional and three-dimensional shape. For example, the projection 20 may have an oval shape cross-section, or the projection 20 may have the shape of a hemisphere, pyramid, obelisk, etc. The projection 20 may also include such features as a tip 26 that is obliquely oriented or contoured to comfortably fit a human digit. The projection 20 need only be capable of maintaining the relative position of concentrically nested tubular elements, as will be described in greater detail with regard to FIGS. 5 and 6.

The closure 30 includes a first portion 32 that is shaped and sized to matingly engage an inside surface of a tubular element, such as inner tube 50 in FIG. 5. The cross-sectional shape of the inside surface may be circular, oval, polygonal, etc. and the first portion 32 may be substantially congruent to this cross-sectional shape. Alternatively, the first portion 32 may include fingers that contact different points along the cross-sectional shape of the inside surface. Moreover, there can be an interference fit between the first portion 32 and the inside surface.

The closure also includes a second portion 34 for overlying an end surface of the tubular element. The size and shape of the second portion 34 can be congruent to the cross-sectional shape of the outside surface of the tubular element. The second portion 34 can include a shoulder that extends beyond the cross-sectional shape of the first portion 32 by a distance that generally corresponds to the wall thickness of the tubular element. Although the second portion 34 has been shown as a disk with a rounded edge 36, the second portion 34 may present any aesthetically pleasing shape or design that occludes the end of the tubular element.

The resilient body 40 includes a first straight portion 46, a bent portion 47, and a second straight portion 48. The first straight portion 46 extends from the projection 20 at the first end 42 to the bent portion 47, and the second straight portion 48 extends from the closure 30 to the at the second end 44 to the bent portion 47. Alternatively, one or both of the portions 46,48 can extend along something other than a straight path, e.g., an arcuate path.

The bent portion 47 can include a substantially continuous radius bend connecting the first and second portions 46,48. Alternatively, the bent portion 47 may include any arrangement that connects the first and second portions 46,48 and enables the resilient body 40 to folded, with confronting faces of the first and second portions 46,48 contiguously abutting one another.

The resilient body 40, including the portions 46,47,48, can be integrally formed as a one-piece unit, or be monolithic. Moreover, the entire fastener 10, i.e., the projection 20, closure 30, and resilient body 40, can be integrally formed as a one-piece unit or be monolithic. Alternatively, the fastener 10 may be separately assembled by permanently fixing the projection 20 to the first portion 46, permanently fixing the first portion 46 to the second portion 48 (i.e., eliminating the bent portion 47), or permanently fixing the cover 30 to the second portion 48.

FIGS. 1–4 show the fastener 10 in a relaxed configuration. The dimensions of the fastener 10, e.g., relative lengths of the first and second portions 46,48 and the radius of the bent portion 47, are selected such that elastically deforming the resilient body 40 biases the projection 20 away from the second portion 48.

FIGS. 5 and 6 show a connection assembly, which includes an inner tube 50, an outer tube 60, and the fastener 10. The inner tube 50 includes an inside surface 52 and an outside surface 54. The wall thickness of the inner tube 50, i.e., the separation between the inside and outside surfaces 52,54, is penetrated by a first hole 56. The outer tube 60 includes an interior surface 62 and an exterior surface 64. The wall of the outer tube 60, i.e., the separation between the interior and exterior surfaces 62,64, has a second hole 66.

The inner tube 50 is concentrically nested or telescopically received inside the outer tube 60. That is to say, the outside surface 54 confronts and is displaceable with respect to the interior surface 62. Similarly, the closure 30 is receivable inside the inner tube 50, as shown in FIG. 6.

The fastener 10 is received inside the inner tube 50. The first portion 32 of the cover 30 confronts and matingly engages the inside surface 52, and the second portion 34 of the cover 30 confronts and contiguously abuts an end 58 of the inner tube 50.

FIG. 5 shows the fastener 10 in a first configuration, where the projection 20 is biased to extend through the aligned first and second holes 56,66. In this first configuration, the relative position of the inner and outer tubes 50,60 is maintained by the projection 20 of the fastener 10.

FIG. 6 shows the fastener 10 in a second configuration, where the projection 20 is biased to extend only through the first hole 56. In this second configuration, the relative position of the inner and outer tubes 50,60 is adjustable.

The biasing force of the resilient body 40 is adapted to be greater in the second configuration (FIG. 6) than in the first configuration (FIG. 5). As noted above, the resilient body 40 does not produce a biasing force in the relaxed configuration (FIGS. 1–4).

A number of variations and modifications are also envisioned within the scope of the present invention. For example, the second hole 66 in the outer tube 60 may be in the shape of a slot extending axially, circumferentially, or obliquely around the outer tube 60. As such, with the fastener 10 in the first configuration, the second hole 66 would enable some degree of relative sliding or turning between the inner and outer tubes 50,60. The outer tube 60 need not fully circumscribe the inner tube 50; in some situations, the outer tube 60 can be formed in the shape of a saddle that only partially circumscribes the inner tube 50. Further there can be some clearance between the first portion 32 of the closure 30 and the inside surface 52 of the inner tube 50. This clearance is possible because the projection 20 will retain the closure 30 at the end 58 of the inner tube 50. The outer tube 60 can also extend beyond the closure 30 on the inner tube 50 and can be closed with a conventional plug or end cap.

In the present invention, the closure can maintain the orientation of the fastener projection with respect to an aperture in a tubular member. In the unlikely event that the projection is displaced with respect to the aperture, the closure can be grasped and the projection repositioned to extend through the aperture. Moreover, the closure can be retained in the end of the tubular member by virtue of the projection extending through the aperture.

Given the disclosure of the present invention, one versed in the art would appreciate that there may be other embodiments and modifications within the scope and spirit of the present invention. Accordingly, all modifications attainable by one versed in the art from the present disclosure within the scope and spirit of the present invention are to be included as further embodiments of the present invention. The scope of the present invention accordingly is to be defined as set forth in the appended claims.

What is claimed is:

1. A fastener for maintaining the relative position of concentrically nested inner and outer tubes, the inner tube having an inside surface and an outside surface separated by a first tubing wall thickness, the outer tube having an interior surface and an exterior surface separated by a second tubing wall thickness, and the inner and outer tubes having respective first and second holes penetrating the first and second wall thicknesses, respectively, the fastener comprising:

a projection adapted for matingly engaging the first and second holes;

a resilient body connected to the projection and adapted to bias the projection through the first and second holes, the resilient body being elastically deformable between a first configuration, where the projection is adapted to extend through the first and second tubing wall thicknesses, and a second configuration, where the projection is adapted to extend through the first tubing wall thickness; and a closure integrally connected to the resilient body and adapted to overlie the first wall thickness, wherein the closure is configured to occlude an end of the inner tube.

2. The fastener according to claim 1, wherein the resilient body includes a first end connected to the projection and a second end connected to the closure.

3. The fastener according to claim 1, wherein the resilient body includes a first straight portion, a second straight portion, and a bent portion connecting the first straight portion and the second straight portion, the first straight portion including the first end and the second straight portion including the second end.

4. The fastener according to claim 1, wherein the closure is adapted for sliding within the interior surface of the outer tube.

5. The fastener according to claim 1, wherein the closure includes a first portion adapted to matingly engage the inside surface of the inner tube and a second portion adapted to confront the interior surface of the outer tube, and wherein the second portion is adapted to overlie the first wall thickness.

6. The fastener according to claim 1, wherein the resilient body is elastically deformable from a third configuration wherein the bias on the projection is relaxed.

7. A connection assembly comprising:

an inner tube having an inside surface and an outside surface separated by a first tubing wall thickness, the inner tube having a first hole penetrating the first wall thickness;

an outer tube having an interior surface and an exterior surface separated by a second tubing wall thickness, the outer tube having a second hole penetrating the second wall thickness; and a fastener maintaining the inner and outer tubes in a concentrically nested position, the fastener including:

a projection matingly engaging the first and second holes;

a resilient body connected to the projection and biasing the projection through the first and second holes, the resilient body being elastically deformable between a first configuration, wherein the projection extends through the first and second tubing wall thicknesses, and a second configuration, wherein the projection extends through the first tubing wall thickness; and a closure integrally connected to the resilient body and overlying the first wall thickness, wherein the closure is configured to occlude an end of the inner tube.

8. The connection according to claim 7, wherein the closure slides within the interior surface of the outer tube.

9. The connection according to claim 7, wherein the closure includes a first portion matingly engaging the inside surface of the inner tube and a second portion confronting the interior surface, and wherein the second portion overlies the first wall thickness of the outer tube.

10. A fastener comprising:

a resilient body having a first straight portion, a second straight portion, and a bent portion connecting the first straight portion and the second straight portion, the resilient body being elastically deformable between a first configuration, where respective ends of the first and second straight portions are apart at a first distance, and a second configuration, where the respective ends of the first and second straight portions are apart at a second distance, which is smaller than the first distance;

a projection extending from the first straight portion, the first straight portion being resiliently deformable from the bent portion to the projection; and a closure integrally connected to the end of the second straight portion, the closure configured to occlude a tubular end opening.

11. A fastener comprising:

a resilient body having a first portion having a free end, a second portion, and a bent portion connecting the first portion and the second portion, the resilient body being elastically deformable between a first configuration, where respective ends of the first and second portions are apart at a first distance, and a second configuration, where the respective ends of the first and second portions are apart at a second distance, which is smaller than the first distance;

a projection extending from the first portion; and a closure connected to the end of the second portion opposite the bent portion, the closure configured to occlude a tubular end opening.

12. The fastener according to claim 11, wherein the projection extends from the first portion adjacent the free end.

\* \* \* \* \*